(12) United States Patent
Katari et al.

(10) Patent No.: US 11,822,420 B2
(45) Date of Patent: Nov. 21, 2023

(54) ARTIFICIAL INTELLIGENCE MODEL MONITORING AND RANKING

(71) Applicant: INTERNATIONAL BUSINESS MACHINES CORPORATION, Armonk, NY (US)

(72) Inventors: Madhavi Katari, Hyderabad (IN); Ravi Chandra Chamarthy, Hyderabad (IN); Swapna Somineni, Hyderabad (IN); Arunkumar Kalpathi Suryanarayanan, Chennai (IN); Prashant Pandurang Mundhe, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 17/499,214

(22) Filed: Oct. 12, 2021

(65) Prior Publication Data

US 2023/0118854 A1 Apr. 20, 2023

(51) Int. Cl.
*G06F 11/00* (2006.01)
*G06F 11/07* (2006.01)
*G06F 11/34* (2006.01)
*G06F 11/30* (2006.01)

(52) U.S. Cl.
CPC ........ *G06F 11/0781* (2013.01); *G06F 11/302* (2013.01); *G06F 11/3075* (2013.01); *G06F 11/3409* (2013.01)

(58) Field of Classification Search
CPC .................................................. G06F 11/0781
See application file for complete search history.

(56) References Cited

U.S. PATENT DOCUMENTS

| | | |
|---|---|---|
| 2019/0130303 A1 | 5/2019 | Bigaj et al. |
| 2019/0332892 A1 | 10/2019 | Wickesberg |
| 2019/0392351 A1* | 12/2019 | Zuluaga ................ G06F 21/552 |
| 2020/0372435 A1 | 11/2020 | Kenthapadi et al. |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

*Primary Examiner* — Amine Riad
(74) *Attorney, Agent, or Firm* — Rakesh Roy; Matthew M. Hulihan; Heslin Rothenberg Farley & Mesiti PC

(57) ABSTRACT

Artificial intelligence (AI) model monitoring and ranking includes obtaining metric values indicative of performance of AI model deployments, the metric values including respective metric values measured across metrics, determining violation statuses of the metrics for each of the AI model deployments, the violation statuses indicating, for each AI model deployment, which of the metrics are violated by the AI model deployment as reflected by respective metric values for that AI model deployment, ranking the AI model deployments against each other according to a ranking model and based on the determined violation statuses for each of the AI model deployments, and providing a rank of at least some of the AI model deployments to a user.

20 Claims, 6 Drawing Sheets

ARTIFICIAL INTELLIGENCE MODEL MONITORING AND RANKING

BACKGROUND

Many enterprises create and deploy artificial intelligence (AI) models based on the particular use cases of the enterprise. The enterprise can then monitor and manage the deployed AI models based on measurements of model metrics, for instance metrics relating to model quality, fairness, explainability, and drift, among other potential types of metrics.

SUMMARY

Shortcomings of the prior art are overcome and additional advantages are provided through the provision of a computer-implemented method. The method obtains, for instance by an artificial intelligence (AI) analyzer component installed in a computing environment, metric values indicative of performance of AI model deployments. The metric values include, for each AI model deployment of the AI model deployments, respective metric values measured across a plurality of metrics. The method also determines violation statuses of the plurality of metrics for each of the AI model deployments based on thresholds configured for the plurality of metrics and on the respective metric values for that AI model deployment measured across the plurality of metrics. The violation statuses indicate, for each AI model deployment of the AI model deployments and each metric of the plurality of metrics, whether the AI model deployment violates the metric, as reflected by the respective metric values measured for that AI model deployment. The method additionally ranks the AI model deployments relative to each other according to a ranking model and based on the determined violation statuses for each of the AI model deployments. In addition, the method provides a rank of at least some of the AI model deployments for presentation to a user.

Further, a computer system is provided that includes a memory and a processor in communication with the memory, wherein the computer system is configured to perform a method. The method obtains, for instance by an artificial intelligence (AI) analyzer component installed in a computing environment, metric values indicative of performance of AI model deployments. The metric values include, for each AI model deployment of the AI model deployments, respective metric values measured across a plurality of metrics. The method also determines violation statuses of the plurality of metrics for each of the AI model deployments based on thresholds configured for the plurality of metrics and on the respective metric values for that AI model deployment measured across the plurality of metrics. The violation statuses indicate, for each AI model deployment of the AI model deployments and each metric of the plurality of metrics, whether the AI model deployment violates the metric, as reflected by the respective metric values measured for that AI model deployment. The method additionally ranks the AI model deployments relative to each other according to a ranking model and based on the determined violation statuses for each of the AI model deployments. In addition, the method provides a rank of at least some of the AI model deployments for presentation to a user.

Yet further, a computer program product including a computer readable storage medium readable by a processing circuit and storing instructions for execution by the processing circuit is provided for performing a method. The method obtains, for instance by an artificial intelligence (AI) analyzer component installed in a computing environment, metric values indicative of performance of AI model deployments. The metric values include, for each AI model deployment of the AI model deployments, respective metric values measured across a plurality of metrics. The method also determines violation statuses of the plurality of metrics for each of the AI model deployments based on thresholds configured for the plurality of metrics and on the respective metric values for that AI model deployment measured across the plurality of metrics. The violation statuses indicate, for each AI model deployment of the AI model deployments and each metric of the plurality of metrics, whether the AI model deployment violates the metric, as reflected by the respective metric values measured for that AI model deployment. The method additionally ranks the AI model deployments relative to each other according to a ranking model and based on the determined violation statuses for each of the AI model deployments. In addition, the method provides a rank of at least some of the AI model deployments for presentation to a user.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
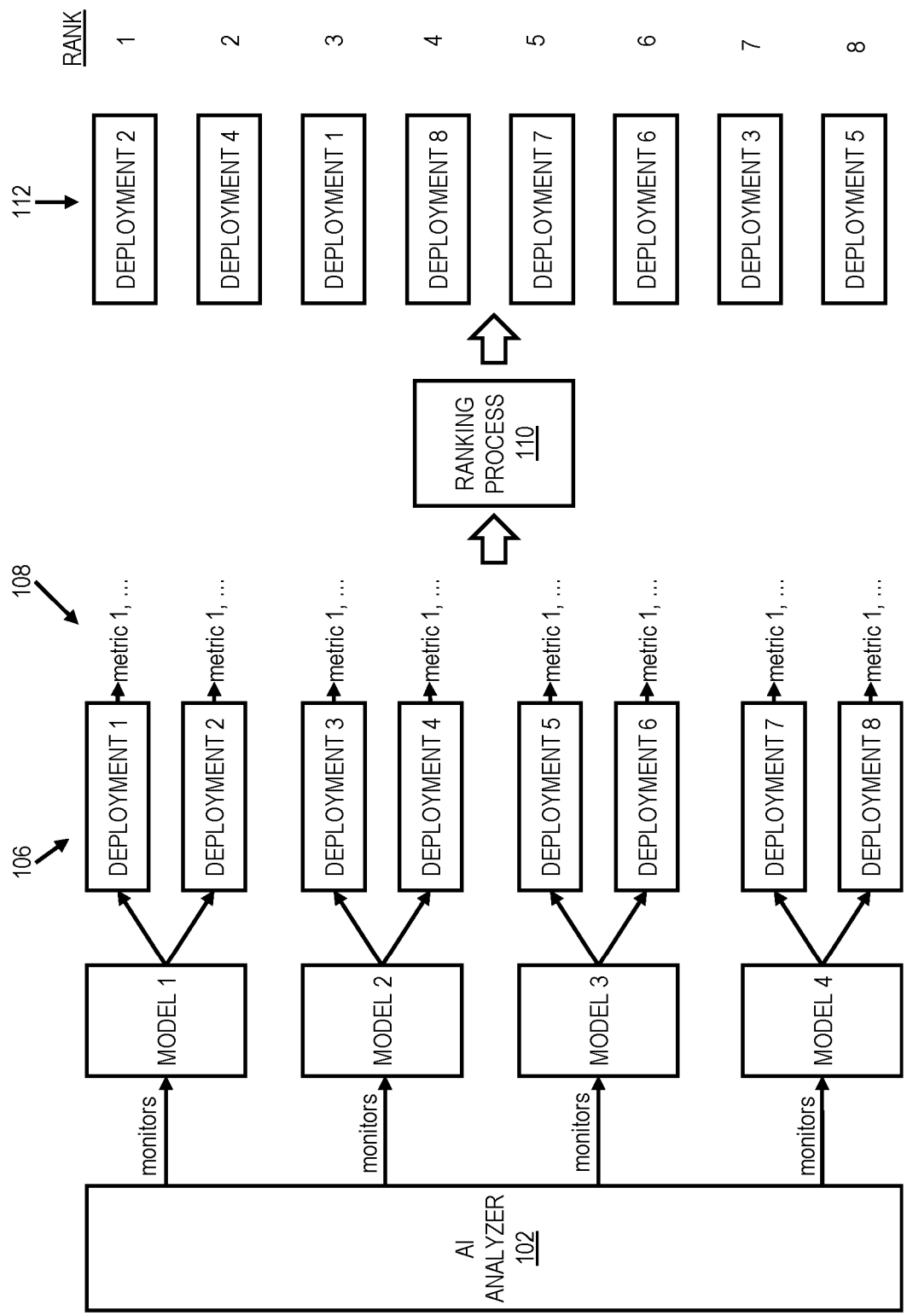
FIG. 1 provides a conceptual depiction of model deployment monitoring and ranking in accordance with aspects described herein.

Artificial intelligence (AI) models—also referred to as machine learning (ML) models and AI prediction models—can be monitored and managed based on measurements of model performance along desired metrics. Monitors are software/hardware components set up to monitor and measure various model metrics. The individual metrics provide indicators of performance. A group of individual metrics being monitored might be indicative of a particular performance category, type, or group. Example such groups include ones directed to model quality, model fairness, model explainability (referring to explainability of prediction outcomes for given inputs, and also referred to as interpretability), and model drift (referring to degradation of model performance over time due to changes in data and relationships between input and output variables). Software offerings can enable users to configure specific thresholds for individual metrics (and/or groups) measured by these monitors and report/display model performance across those metrics/groups. This can include alerting users when thresholds are exceeded or 'violated' as defined by configured violation rules.

An 'AI model deployment' as used herein refers to a deployed/installed functional AI model, i.e. one that was developed within a particular model framework and tuned according to a set of tuning parameters to perform AI model processing, such as providing outcome predictions for given inputs. Various AI models can be developed using different AI model frameworks and tuning parameters, then deployed/installed as model deployments. In some examples, enterprises can configure tens or even thousands of AI model deployments for installation into production, testing, and other types of environments.

The monitors gather metrics from/about the AI model deployments. The metrics are measured in the form of data values, which can include gathered values as well as statistically-computed values produced or determined from or based on gathered data, such as averages, ranges, and amounts by which the values exceed other values such as configured thresholds. Metric values might be obtained, gathered, received, determined or computed periodically and/or aperiodically, in bulk/batch or as a stream, at varying frequencies and/or quantities of incoming data values, and about varying numbers of models (possibly in the hundreds or thousands), each with numerous metrics (tens or hundreds) being monitored, as examples. Depending on the foregoing complexities, and due to the sheer number of models to monitor, the volume of data gathered, the number of different metrics that might be monitored for each model deployment, the frequency by which data may be gathered and computed (averaging or computing one or more metric values per second for instance), it can quickly become unmanageable, impractical and/or impossible for business users to monitor all model deployments with the desired frequency and understand which models are experiencing critical, high-priority problems to be reviewed/remediated.

Described herein are approaches for automatic monitoring and ranking of AI model deployments based on performance attributes thereof. Aspects gather metrics on model performance for a collection of deployed AI models and evaluate AI model deployment performance in relation to performance thresholds configured for the model deployments. Breaches/violations, referring to whether performance by a given AI model deployment along a metric or group of metrics as reflected by the metric values for that AI model deployment exceeds defined threshold(s), are tracked and the model deployments are ranked based on these violations across performance indicators.

AI models solve prediction problems by taking inputs and providing a prediction/outcome based on those inputs. Classification AI models provide predictions in the form of classifications of a set of input(s) into binary (e.g. yes/no, approval/disapproval, etc.) or multiple classifications (e.g. species of animal, etc.) outputs. Other types of AI models are regression or continuous models that provide outputs along some range or spectrum of possible outcomes, such as prediction of a home sale price in a residential home sales transaction based on attributes of the transaction. In any case, AI models are prediction models that solve prediction problems by taking inputs and providing one or more outputs referred to as predictions or prediction outcomes. Typically, though not always, an AI model is trained using labeled training data that provides inputs and labeled outputs to teach the model accurate predictions based on given inputs.

For a given prediction problem, multiple models can be developed. In one aspect, different model frameworks are used to develop different models. Example model frameworks include Spark MLib (offered by the Apache Software Foundation, Wakefield, Massachusetts, U.S.A.), TensorFlow (offered by Google LLC., Mountain View, California, U.S.A.), and Scikit-learn (offered at scikit-learn dot org). Models developed under different frameworks can vary in their performance, which will be reflected in the metric values measured for those models even when they are used to make predictions from the same inputs. In a further aspect, a model developed under one framework can differ based on different tuning parameter changes used to produce variants of that model. Thus, different model frameworks and/or different tuning parameters used to create models can result in differing model deployments intended to address the same prediction problem (provide prediction outcomes given inputs). As an example, a model m1 developed using a first framework can result in different model deployments (m1_d1, m2_d2, . . . , m1_dn) based on use of different tuning parameters to tune the model m1, while a model m2 developed using a second framework, different from the first, can result in different model deployments (m2_d1, m2_d2, . . . , m2_dn) based on use of different tuning parameters tune model m2.

To illustrate these and other aspects, FIG. 1 provides a conceptual depiction of model deployment monitoring and ranking in accordance with aspects described herein. AI Analyzer 102 is an enterprise-grade environment for AI applications that provides visibility into how an enterprise's AI is built and performing. It can provide insight into how AI models make decisions, and facilitate the detection and mitigation of bias, drift, and other performance markers/indicators. Additionally, it provides metric monitors for individual models. In this example, four models (Model 1, Model 2, Model 3, Model 4) are built using four different AI model frameworks and each of the four models is tuned two ways to provide a corresponding two different AI model deployments for each of the four AI models, resulting in eight model deployments (106) total in this example. In practice, there may be hundreds or thousands of AI model deployments to be ranked against/relative to each other.

Different AI model deployments might perform differently for the same prediction problem, even when trained on the same training data and given the same inputs against which to make predictions. As a result, it may be desired to monitor each model deployment across multiple metrics as it makes predictions. Model deployments can be monitored for their fairness, drift (concept and/or data drift), quality, and transaction explanations/interpretability, as example. Varying metrics can be used to assess performance along these performance categories or indicators. Metrics to assess a given performance category can be grouped into a metric group or related metrics—related in that they are used to assess model performance for that category. Each metric group can include one or more, and potentially tens or more, metrics to monitor. A metric group for fairness, for instance, might monitor the individual metrics of disparate impact ratio, false positive rate difference, statistical parity difference, average odds difference, and others, and a metric group for quality might monitor for individual metrics of the known 'F1 measure', recall, precision, and others. Accordingly, with reference again to FIG. 1, the monitors monitor and measure/determine metrics 108 for each model deployment. The metrics are reflected as metric values.

The particular metrics monitored/measured for one model deployment may be at least partially, and maybe wholly, the same as the metrics monitored/measured for another model deployment. It may be desirable for purposes of fair comparison to measure the some same/common collection of metrics for AI model deployments to be ranked against each other.

The metric values can be obtained as the different AI model deployments are put to task to make predictions for the same prediction problem(s). In a particular scenario, the same sets of input values are provided to the different AI model deployments against which they make/produce prediction outcomes, and then the monitored metrics are determined based on those outcomes. In some examples, the model deployments are given a combination of some same and some different input values against which to make predictions. Whether or not all AI model deployments being ranked against each other are given the same inputs for a particular prediction problem can depend on the nature of the inputs and the particular prediction problem. In situations where the distribution of inputs to the different model deployments can confidently yield model performance metrics for those model deployments that can be fairly compared to each other, then it may be that the model deployments receive at least some different input data against which to make their predictions. In other words, there may be situations where true model performance can be determined for different model deployments regardless of whether they are given the exact same or different inputs against which to make predictions.

Referring back to FIG. 1, the gathered metric data can be used in a ranking process 110 to rank the deployments in terms of performance. The particular ranking approach taken by the ranking process 110 could vary and may be tailored as desired. Certain metrics could be weighted differently than others in terms of how significantly a model deployment's breach of the metric influences the ranking of that model deployment. In some examples, only some of the metrics are considered in the ranking and/or metric violations are considered in groups for purposes of the ranking. The ranking process 110 outputs a ranking 112 of the model deployments, enabling a user/model scientist to then make decisions based on this ranked performance indication.

Use of numerous metric measurements for model performance renders it difficult to ascertain model deployment performance and rank model deployments against each other. Further, it would be impractical or impossible for a user to manually or mentally assess performance of model deployments across the desired metrics, using the volume of metrics values gathered, and apply ranking models to those. Thus, the AI analyzer 102 can be leveraged to automatically determine metric breaches and rank the model deployments. For instance, the following can be performed in AI analyzer 102:

Configure model deployments for fairness monitoring across multiple different fairness attributes (metrics) and configure respective acceptable fairness thresholds for each of those attributes;

Configure model deployments also for quality and drift monitoring across multiple attributes and associated thresholds for each of those attributes;

Configure explainability monitoring that analyzes confidences in contribution of various attributes to prediction outcomes, and configure thresholds for those confidences; and Measure the metric values (data values) for comparison to the configured thresholds.

Ranking the model deployments can proceed based on violation statuses of the metrics for each of the AI model deployments. 'Violations' can be considered and contribute to ranking at any level of granularity, meaning violations of individual metrics might directly or indirectly contribute to model rankings. In a specific example, the ranking determines which metric group(s) have been violated, the metric groups referring to groups of metrics for a common performance indicator. As explained above, different groups might include different monitored metrics. Example metric groups discussed herein are fairness, drift, explainability, and quality, though any desired metric groups could be used. Individual metrics and/or metric groups can be evaluated using violation processing rules that compare measured metric(s) to the thresholds configured for those metrics/metric groups. A 'group violation status' is a status as to whether the model deployment violates the metric group as a whole. This could be determined as a function of: a number of metrics, of the related metrics of the group, that the AI model deployment violates, a degree by which one or more metrics, of the related metrics of the group, violated by the AI model deployment exceed respective configured thresholds for the one or more violated metrics, and/or a frequency at which, or a duration of time for which, one or more metrics of the related metrics of the group violated by the AI model deployment exceed respective configured thresholds for the one or more violated metrics, as examples. The foregoing can be threshold(s) configured for use with violation processing rules to determine the group violation status for a metric group. The individual metrics themselves can have their own configured threshold(s) configured for use with violation processing rules to determine the violation status for an individual metric.

Figure 2:
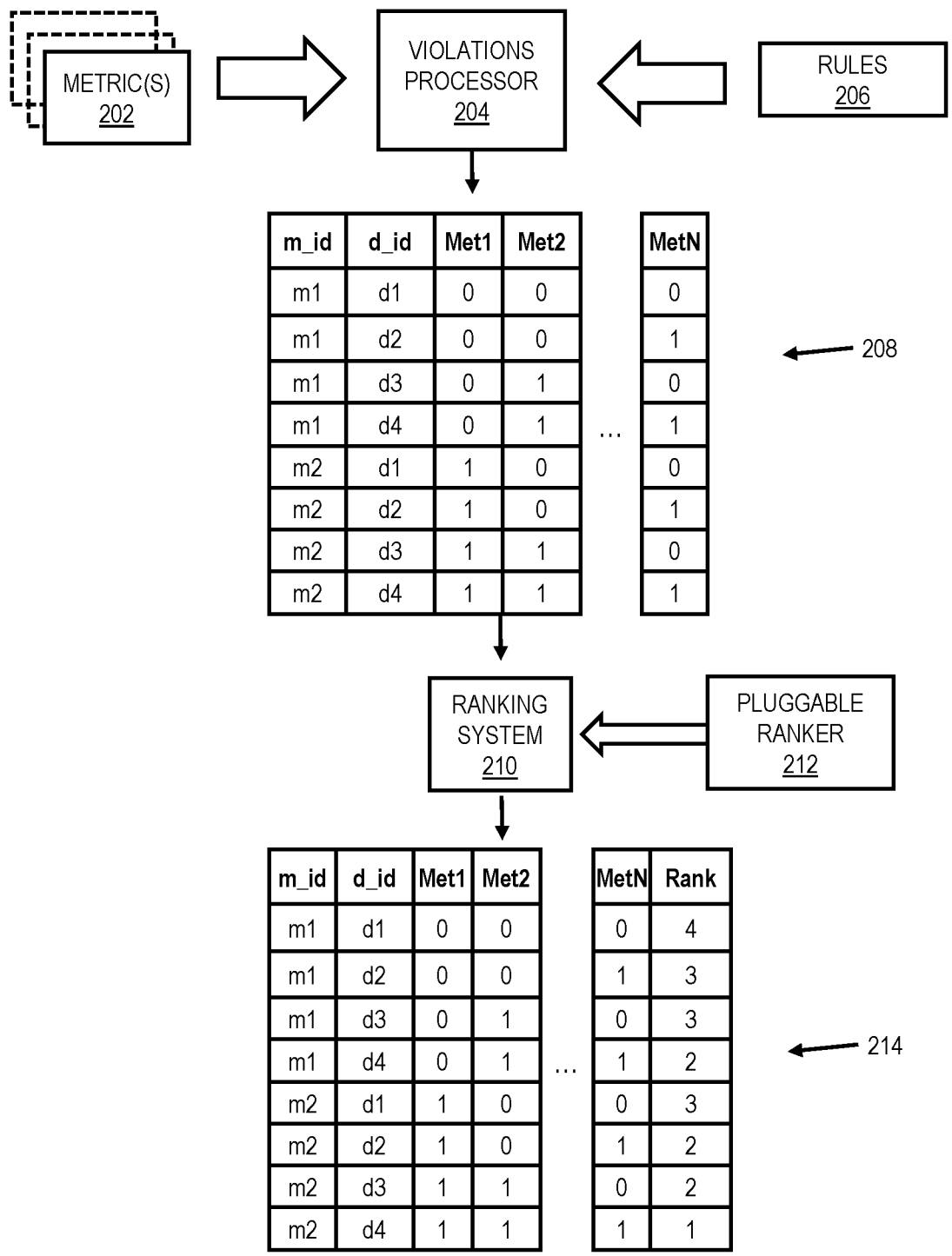
FIG. 2 depicts an example approach to model ranking based on violation statuses, in accordance with aspects described herein.

FIG. 2 depicts an example approach to model ranking based on violation statuses, in accordance with aspects described herein. A violations processor 204, for instance of an AI analyzer, receives metric values 202, and receives or is configured with violation processing rules 206. The rules work based on corresponding thresholds indicating metric values/ranges. Rules define and evaluate what metric performance values obtained with respect to a given AI model deployment are considered violations by that model deployment and are based on configured thresholds. Each metric being monitored/measured can have one or more corresponding thresholds defined for it. For each AI model deployment, the violations processor can determine, for each metric, whether the model deployment violates that metric based on the configured threshold(s) for that metric and on the metric value(s) gathered for that metric and for that model deployment.

As an example, a metric in the 'prediction bias' metric group might be 'Prediction bias level of feature/attribute A'. A collected metric value for that metric of a given model deployment might be 5%. A configured threshold for the metric might be 3%, in which the violation rule allows up to a 3% prediction bias for feature A before it is considered a violation of that metric by that model deployment. The violation status for this metric and model deployment could therefore reflect that the model deployment violates this metric because 5% is greater than the configured threshold of 3%. In examples, a degree by which a threshold is violated can also be determined/reflected (e.g. a percentage or number over or under the threshold, for instance). Further, the violations processor can also track how often the model deployment violates one or more metrics and/or how long metric violation(s) by the model deployment have existed for each or one or more metrics. Any other desired information regarding metric violations can be gathered, determined, tracked, and/or represented.

The violations processor can determine a violation status for each metric and model deployment combination. Thus, continuing with FIG. 2, and using the information about violations, the violations processor or other component, such as a component of the AI analyzer, automatically produces a dataset 208. Example dataset 208 includes columns for model identifier (m_id, indicating a model built using a specific model framework) and deployment identifier (d_id, indicating different model deployments produced based on using different tuning parameters of the model). There are two models m1, m2 in this example and each is tuned using four different sets of tuning parameters; model m1 is tuned four ways and model m2 is tuned four ways. Each row therefore corresponds to a different model deployment. The dataset can also reflect any violation status information desired. In this example, dataset 208 includes a column for each metric and provides a breach/violation indicator/status for each model deployment indicating whether the measured metric value(s) of that model deployment and for that particular metric exceed the configured threshold(s) for that metric. In examples, a value of 0 is set as the violation status for a metric if the model deployment is in violation along that metric, i.e. the measured metric value(s) for that model exceed the configured threshold for that metric. Otherwise, if the metric is not breached, then the violation status is set to a value of 1. In this example, there are N number of metrics reflected.

The dataset 208 is used by a ranking system 210 to rank the model deployments. The ranking system 210 performs a ranking using a ranking model provided as input (directly or by way of indication) to the ranking system 210 as a pluggable ranker 212. The pluggable ranker 212 defines how the violation statuses are used to determine the ranks of the model deployments. Some violation statuses may weigh more heavily than others in terms of contributing to the rank of a model deployment. For instance, certain violations may be more determinative of model rank on account that the metrics correlating to those violations are more critical to achieving an acceptable level of model performance or are otherwise more important that are other metrics. The ranking system 210 produces a ranking 214 of the model deployments according to the particular ranker 212 plugged into the ranking system 210.

It is noted that the ranking could rank in tiers (1, 2, 3 and 4 in this example) in which more than one model deployment could be ranked at a tier, such as with model deployments m1d4, m2d2 and m2d3. It is also noted that the pluggable ranker in the example of FIG. 2 ranks based on a number of 1s (or 0s) for each model deployment. m2d4, the highest ranked model deployment, has no metric violations reflected, while model deployment midi violates all metrics as reflected by the dataset.

Violations could change over time and therefore so could the rankings.

As explained above, model ranking could utilize the metrics at any desired level of granularity. The ranking could examine violation status at the individual metric level and/or a group level. Individual metrics (having their own individual violation statuses) could be grouped in any desired manner. In examples, some metrics are grouped by the specific performance indicators (e.g. fairness, drift, quality, explainability, etc.) to which they correspond. A collection of 15 metrics might be monitored to determine an overall fairness performance indicator, for example. The violations processor and/or the ranking system could determine group violation statuses for these groups based on the individual violation statuses of the metrics in those groups, and the ranking system could determine model rankings based at least in part on these group violation statuses.

In some examples, the pluggable ranker is a default ranker unless specifically selected or configured by a user, such as a model scientist. A model scientist could define one or more different pluggable rankers that are available for selection to plug into the ranking system when appropriate. The ranking system uses whichever pluggable ranker it is given as input in order to perform the ranking. Ranking models used could be of varying complexities based on the complexity of the functions used or analysis performance in determining rank, and therefore may not be practically achievable manually, mentally, and/or absent being performed by a computer.

In some examples, aspects discussed with reference to FIGS. 1 and 2 are performed periodically or aperiodically to rank the model deployments more than once. Model ranking could be tracked over time to inform model deployment(s) to be used in specific applications and/or production environments. Thus, violation statuses can be re-determined periodically or aperiodically using, at least in part, updated metric values gathered about the deployed AI models. The ranking system can perform model ranking at each iteration, perhaps using different pluggable ranker(s) at different times and/or contemporaneous with each other.

The ranking ranks the AI model deployments relative to each other, and is not necessarily reflective, in itself, as to the objective performance level of any of the AI model deployments. The 'best' ranked model deployment of the AI model deployments might nonetheless be poor performing in general, depending on the significance of the violation statuses of that model for the monitored metrics. In this regard, while the AI model deployments may be considered on their own based on whatever qualitative metrics are determined about the performance of each of the AI model deployments, the ranking produced reflects how each AI model deployment compares to the other considered AI model deployments, as defined by the particular ranking model used.

Approaches discussed herein can be used to evaluate model deployments in pre-production, testing, and or production environments. In examples, testing and ranking of a collection of candidate AI model deployments is performed before installation of one or more model deployments at a customer site. The collection of candidates us produced and run against one or more prediction problems (each including sets of inputs for which the models are to generate predictions) to produce metric values. The model deployments are monitored to obtain the metric values and the model deployments are ranked, perhaps numerous times and/or via different ranking models. An overall or aggregate ranking of each of the model deployments can be determined and optionally provided to a user for inspection or analysis and selection. In other examples, the best (highest ranking) model(s) are automatically selected. Some number (1, 2, 5, 10, . . . ) of the highest ranked model(s) can then be selected and installed into production environment(s) of the customer, potentially for further monitoring and ranking.

Additionally or alternatively aspects can be applied to AI model deployments in production. Data inputs to models might vary in production from the training data/testing data used pre-production. This can result in model drift. Aspects can monitor model deployments in production and rank them, optionally emphasizing more heavily the violations of metrics related to model drift performance indicators (as compared to metrics measuring other performance indicators) when ranking the model deployments, in order to identify best/worst model deployments in terms of drift and take desired actions accordingly, for instance to remove/uninstall/cease use of model deployments and/or select model deployments to maintain or use elsewhere. In this regard, different metrics and/or ranking models can be used at different phases of the model lifecycle—from building to training to testing to production—to emphasize at each phase whichever performance indicators are most important at that phase.

Figure 3:
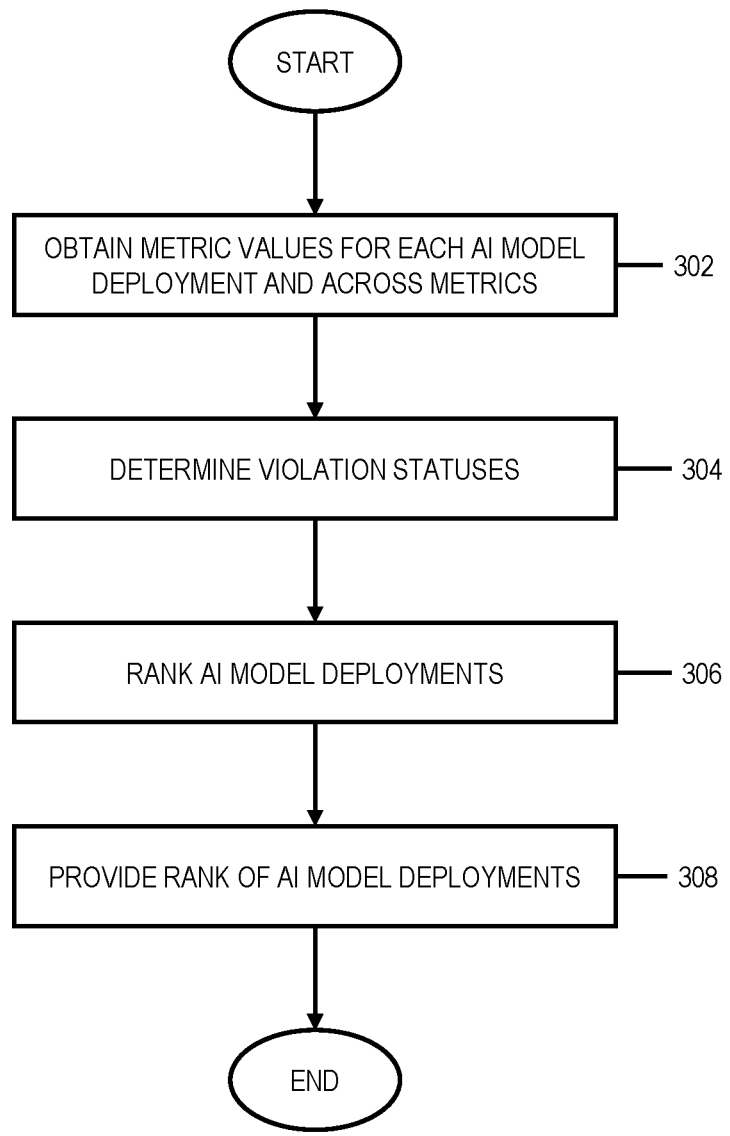
FIG. 3 depicts an example process for artificial intelligence model monitoring and ranking, in accordance with aspects described herein.

FIG. 3 depicts an example process for artificial intelligence model monitoring and ranking, in accordance with aspects described herein. In some examples, the process is performed by one or more computer systems, such as those described herein, which may include one or more computer systems running an AI analyzer component of a computing environment, one or more cloud servers, and/or one or more other computer systems.

The process includes obtaining (302), by an AI analyzer component installed in a computing environment, metric values indicative of performance of AI model deployments. The metric values include, for each AI model deployment of the AI model deployments, respective metric values measured across a plurality of metrics. Accordingly, each of the AI model deployments is monitored across a collection of metrics and thus, for each of the metrics, there are metric value(s) obtained pertaining to each AI model deployment and indicating model deployment performance along that metric. All of the AI model deployments may be monitored across these metrics, though in some embodiments some of the model deployments may be additionally monitored for some metrics for which others of models are not monitored.

The AI model deployments may differ from each other, for instance based on tuning parameters used to tune the model deployment and/or model frameworks under which they are built. Each of the AI model deployments is built using/in accordance with a given AI model framework. Different AI model frameworks may be used to build different AI model deployments. Some AI model deployment(s) can be built using one AI model framework and other AI model deployment(s) can be built using another AI model framework that is different from the one AI model framework. Yet other AI model deployments may be built using a third AI model framework, and so on. Additionally or alternatively, different tuning parameters can be used to tune AI models differently and thereby produce different AI model deployments. Thus, for an AI model built using a particular AI model framework, tuning that model using different tuning parameters will produce different resulting AI model deployments. Thus, some of the monitored AI model deployments are tuned using first tuning parameters and others of the monitored AI model deployments are tuned using second tuning parameters different from the first tuning parameters. The resulting differences in the AI model deployments can be expected to result in the AI model deployments providing different prediction outcomes for the same prediction problem, even when provided the same inputs. Hence, the AI model deployments can be expected to differ in their performance and therefore drive a desire to rank them to determine which of the model deployments performs most desirably.

Returning to FIG. 3, the process determines (304) violation statuses of the plurality of metrics. This is performed for each of the AI model deployments and is based on thresholds that are configured for the plurality of metrics as well as the respective metric values for that AI model deployment measured across the plurality of metrics. For each AI model deployment being monitored, there is/are metric value(s) that inform about that model deployment's performance along the corresponding metric. Based on a configured threshold, the AI model deployment either violates or does not violate (in this example) that metric. In other examples, the violation status could be expressed as a degree rather than a binary yes/no violation status. The violation statuses therefore indicate, for each AI model deployment of the AI model deployments and each metric of the plurality of metrics, whether the AI model deployment violates the metric, as reflected by the respective metric values measured for that AI model deployment. In other words, there is a respective set of violation statuses determined for each AI model deployment. Each set corresponds to one of the monitored AI model deployments and there is a respective violation status for each metric of the plurality of metrics in that set.

Based on the determined violation statuses for each of the AI model deployments, the process ranks (306) the AI model deployments relative to each other according to a ranking model, and provides (308) a rank of at least some of those AI model deployments for provision to a user, for instance in the form of a chart or other depiction for display to the user on a graphical user interface.

The metric values can be obtained at 302 based on the process applying the AI model deployments to one or more prediction problems. A given prediction problem is presented as sets of inputs based on which each of the AI model deployments provides prediction outcomes to make predictions for the prediction problem. The inputs can be provided to each AI model deployment, which generates and outputs a prediction. The predictions can be analyzed and model metrics produced, which can be measured. Each of the AI model deployments provides prediction outcomes based on the sets of inputs and the obtained metric values are those measured based on the prediction outcomes provided by the AI model deployments based on the applying.

The process could also include installing monitor components that measure at least some of the metric values based on predictions by the AI model deployments and provide them for an AI analyzer component. In some embodiments, some of the metric values are computed/determined from, based on, or using other metric values. Example such computed metric values include averages, other statistical determinations, and/or degrees/extends of threshold violation.

The ranking (306) can be performed by a ranking component, such as a ranking component of the AI analyzer. The ranking component is configured to take pluggable rankers as input, meaning different rankers could be indicated, selected and/or provided to the ranking component, each such ranker defining how to rank the AI model deployments based on the determined violation statuses.

The metrics can include any desired metrics. Some metrics are designed to assess model performance along a particular dimension, type, or category. Thus, the plurality of metrics can include different groups of related metrics—metrics that are related in that they are used to assess a common performance indicator. The ranking can account for whether groups as a whole violate some threshold(s) configured for that group. The process can, for instance, as part of determining the violation status or as part of the ranking, determine, for each of the AI model deployments and each group of the plurality of groups of metrics, a respective group violation status indicating whether the AI model deployment violates the group as reflected by violation statuses for that AI model deployment and the metrics of that group, and the ranking can rank the AI model deployments based at least in part on the group violation statuses for the AI model deployments.

As a specific example, a group violation status, of a group of related metrics, for an AI model deployment of the AI model deployments can be determined as a function of a number of metrics of the related metrics of the group, that the AI model deployment violates. By way of example, in an example metric group that includes 10 metrics, each AI model has a corresponding violation status for each of the 10 metrics (indicating whether that model deployment's performance violates that metric based on the threshold set for that metric). A group violation threshold could specify a number (say 3) or percentage (say 30%) such that if 3 or 30% of the metrics of the 10 metrics in the group are violated by the AI model deployment, then the AI model deployment violates that metric group as a whole, and this could be used in determining the group violation status.

Group violation status for an AI model deployment could additionally or alternatively be determined as a function of degree(s) by which violated metric(s), of the related metrics of the group, exceed respective configured thresholds for the violated metric(s). The degree to which each violated metric of the group is exceeded can be determined based on (i) the AI model deployment's metric values for those metric(s) and (ii) the threshold(s) set for those metric(s). The resulting degree(s) can be used to determine whether the AI model deployment violates that metric group. This could be a function of any one or more of the degrees. As one example, an AI model deployment violates a group as a whole if any n number of metrics are exceeded by a degree of 50% or more. As another example, the AI model deployment violates a group as a whole if the average degree of individual metric violation is above 15%.

Group violation status for an AI model deployment could additionally or alternatively be determined as a function of a frequency at which, or a duration of time for which, metric(s) of the related metrics, of the group, violated by the AI model deployment exceed respective configured thresholds for the violated metric(s). As examples, the group is in violation if a selected number of metrics are violated for longer than a selected amount of time or violated more frequently than some selected frequency.

The plurality of metrics could include be any number of metrics, though in specific examples there are tens or hundreds of metrics that are being monitored and measured for each of the AI model deployments. The AI model deployments can total any number, though in specific examples there are tens, hundreds, or thousands that are monitored and for which metric values are obtained for each of the plurality of metrics. Thus, there may be hundreds, thousands, or millions of metric values obtained, and this may occur at any desired frequency. In examples, the frequency averages at least once per minute. The ranking can be performed at any time and with any desired frequency, using any number of ranking models. Rankings from different models and/or made at different times based on different input metrics values and/or violation thresholds could be aggregated or composited to determine overall ranking of the models.

Although various examples are provided, variations are possible without departing from a spirit of the claimed aspects.

Figure 4:
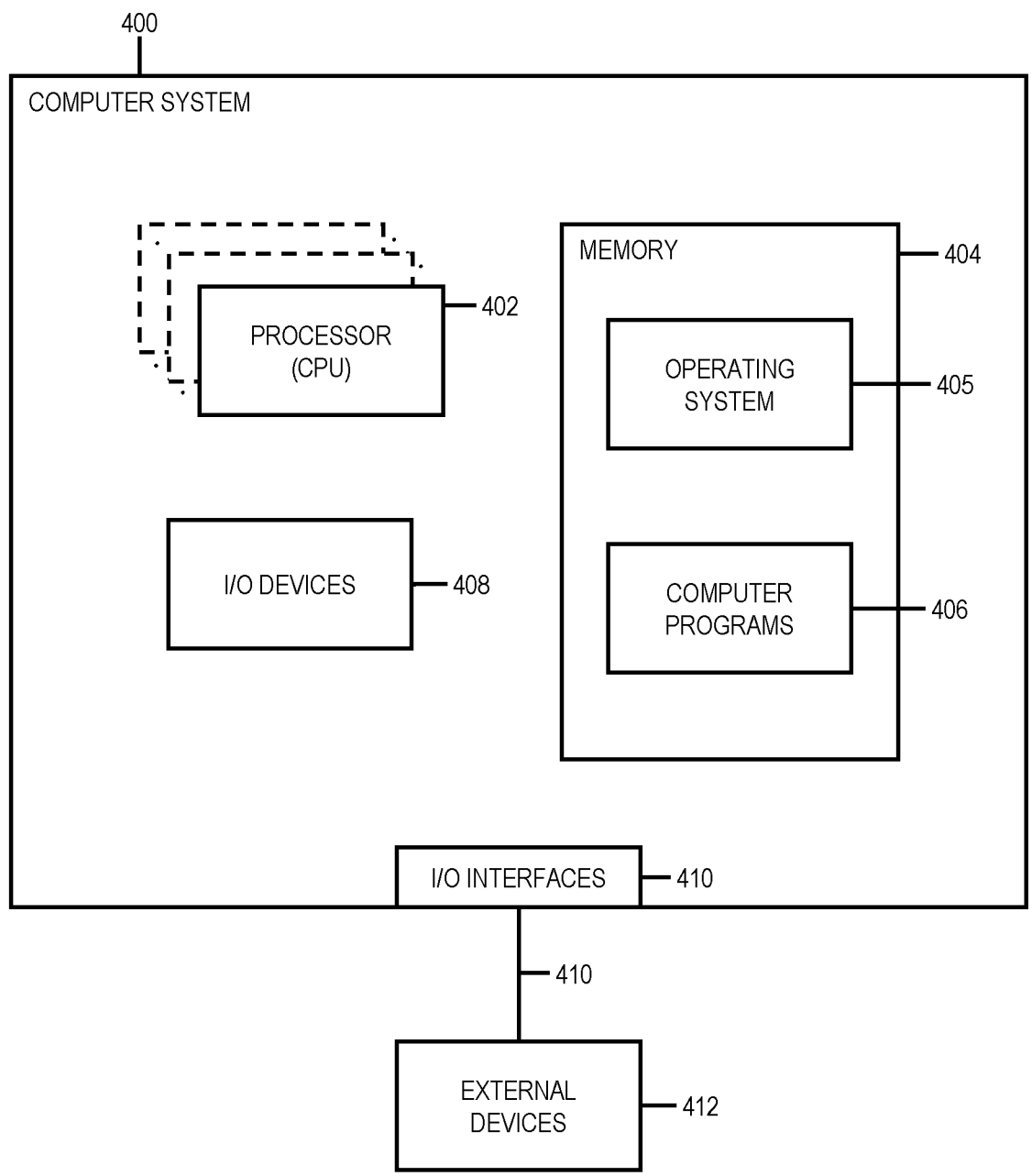
FIG. 4 depicts one example of a computer system and associated devices to incorporate and/or use aspects described herein.

Processes described herein may be performed singly or collectively by one or more computer systems. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
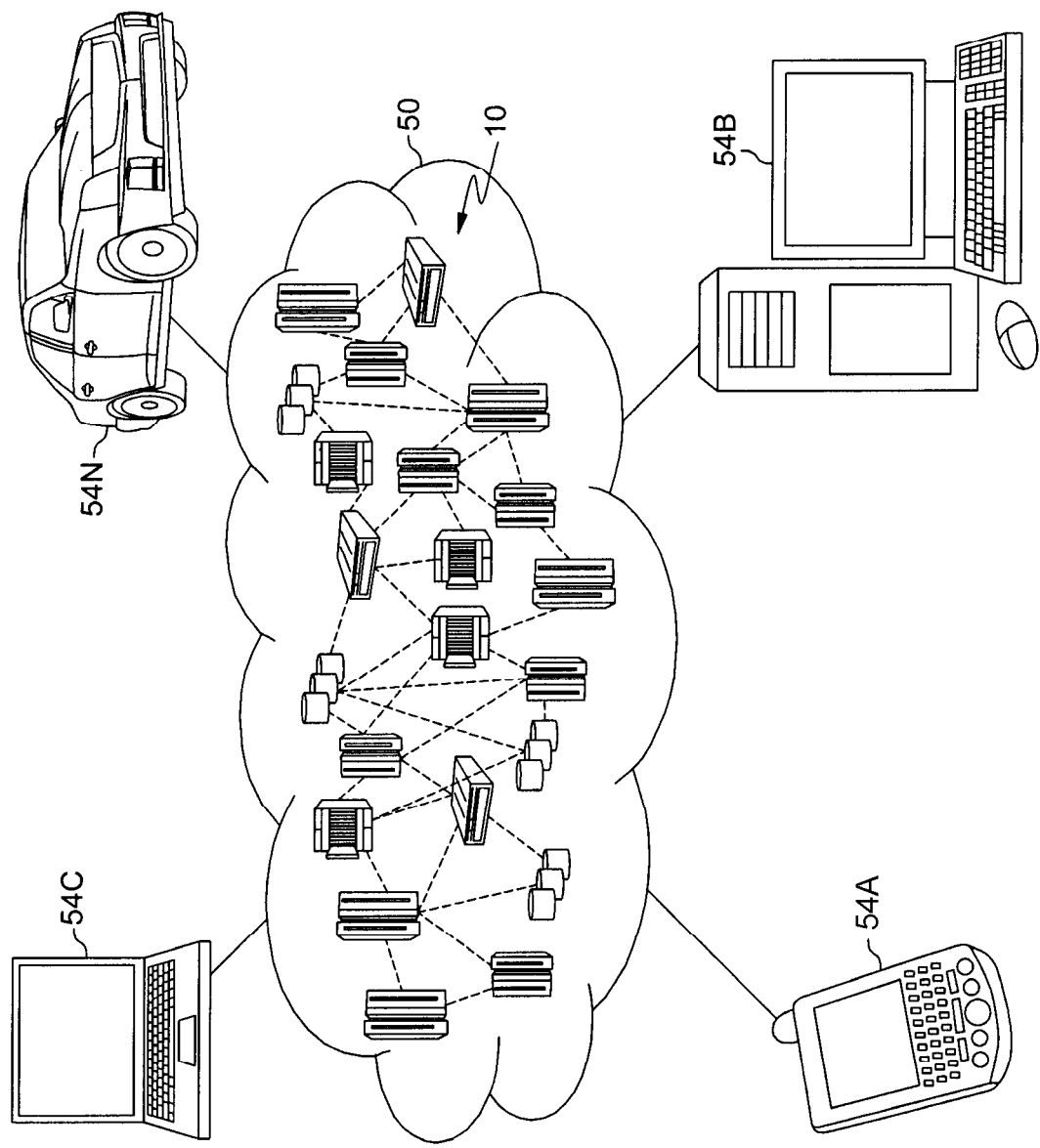
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
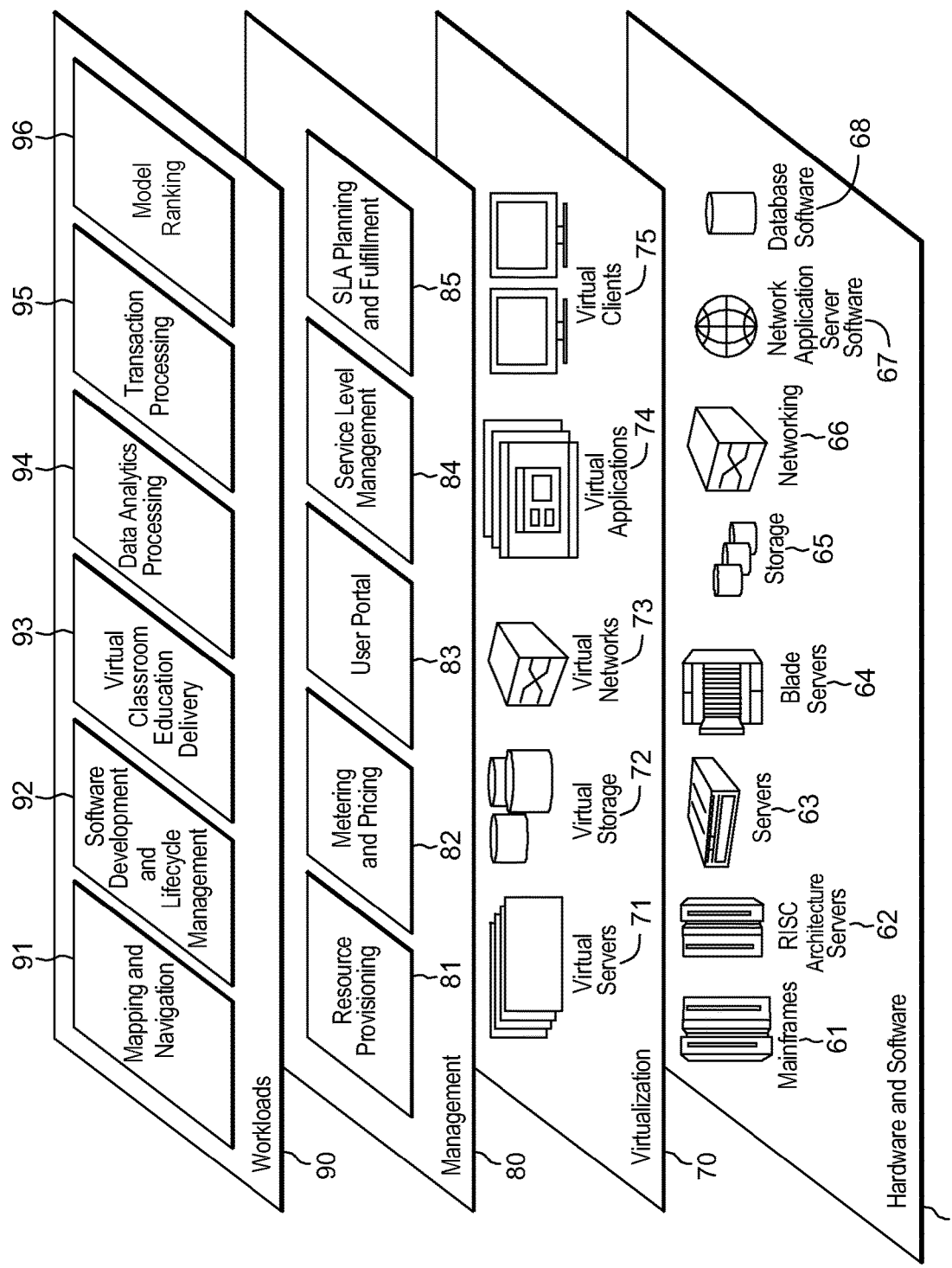
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model ranking 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
obtaining, by an artificial intelligence (AI) analyzer component installed in a computing environment, metric values indicative of performance of AI model deployments, the metric values comprising, for each AI model deployment of the AI model deployments, respective metric values measured across a plurality of performance metrics, the performance metrics being metrics of performance of the AI model deployments;
determining violation statuses of the plurality of performance metrics for each of the AI model deployments based on thresholds configured for the plurality of performance metrics and on the respective metric values for that AI model deployment measured across the plurality of performance metrics, the violation statuses indicating, for each AI model deployment of the AI model deployments and each performance metric of the plurality of performance metrics, whether the AI model deployment violates the performance metric, as reflected by the respective metric values measured for that AI model deployment;
ranking the AI model deployments relative to each other according to a ranking model and based on the determined violation statuses of the plurality of performance metrics for each of the AI model deployments; and
providing a rank of at least some of the AI model deployments for presentation to a user.

2. The method of claim 1, further comprising applying the AI model deployments to a same prediction problem, in which each of the AI model deployments provides prediction outcomes based on sets of inputs provided to each of the AI model deployments to make predictions for the prediction problem, wherein the obtained metric values are measured based on the prediction outcomes provided by the AI model deployments based on the applying.

3. The method of claim 1, wherein the plurality of performance metrics comprise a plurality of groups of related performance metrics, wherein the method further comprises determining, for each of the AI model deployments and each group of the plurality of groups, a respective group violation status indicating whether the AI model deployment violates the group as reflected by violation statuses for that AI model deployment and the performance metrics of that group, and wherein the ranking ranks the AI model deployments based at least in part on the group violation statuses for the AI model deployments.

4. The method of claim 3, wherein a group violation status, of a group of related performance metrics, for an AI model deployment of the AI model deployments, is determined as a function of at least one selected from the group consisting of: (i) a number of performance metrics, of the related performance metrics of the group, that the AI model deployment violates, (ii) a degree by which one or more performance metrics, of the related performance metrics of the group, violated by the AI model deployment exceed respective configured thresholds for the one or more violated performance metrics, and (iii) a frequency at which, or a duration of time for which, one or more performance metrics of the related performance metrics of the group violated by the AI model deployment exceed respective configured thresholds for the one or more violated performance metrics.

5. The method of claim 1, wherein one or more of the AI model deployments are built using a first AI model framework and one or more of the AI model deployments are built using a second AI model framework different from the first AI model framework.

6. The method of claim 1, wherein one or more of the AI model deployments are tuned using first tuning parameters and one or more of the AI model deployments are tuned using second tuning parameters different from the first tuning parameters.

7. The method of claim 1, further comprising installing monitor components that measure at least some of the metric values based on predictions by the AI model deployments and provide the at least some of the metric values for the AI analyzer component.

8. The method of claim 1, wherein the ranking is performed by a ranking component configured to take the ranking model as an input pluggable ranker defining how to rank the AI model deployments based on the determined violation statuses.

9. A computer system comprising:
a memory; and
a processor in communication with the memory, wherein the computer system is configured to perform a method comprising:
obtaining, by an artificial intelligence (AI) analyzer component installed in a computing environment, metric values indicative of performance of AI model deployments, the metric values comprising, for each AI model deployment of the AI model deployments, respective metric values measured across a plurality of performance metrics, the performance metrics being metrics of performance of the AI model deployments;
determining violation statuses of the plurality of performance metrics for each of the AI model deployments based on thresholds configured for the plurality of performance metrics and on the respective metric values for that AI model deployment measured across the plurality of performance metrics, the violation statuses indicating, for each AI model deployment of the AI model deployments and each performance metric of the plurality of performance metrics, whether the AI model deployment violates the performance metric, as reflected by the respective metric values measured for that AI model deployment;
ranking the AI model deployments relative to each other according to a ranking model and based on the determined violation statuses of the plurality of performance metrics for each of the AI model deployments; and
providing a rank of at least some of the AI model deployments for presentation to a user.

10. The computer system of claim 9, wherein the method further comprises applying the AI model deployments to a same prediction problem, in which each of the AI model deployments provides prediction outcomes based on sets of inputs provided to each of the AI model deployments to make predictions for the prediction problem, wherein the obtained metric values are measured based on the prediction outcomes provided by the AI model deployments based on the applying.

11. The computer system of claim 9, wherein the plurality of performance metrics comprise a plurality of groups of related performance metrics, wherein the method further comprises determining, for each of the AI model deployments and each group of the plurality of groups, a respective group violation status indicating whether the AI model deployment violates the group as reflected by violation statuses for that AI model deployment and the performance metrics of that group, and wherein the ranking ranks the AI model deployments based at least in part on the group violation statuses for the AI model deployments.

12. The computer system of claim 11, wherein a group violation status, of a group of related performance metrics, for an AI model deployment of the AI model deployments, is determined as a function of at least one selected from the group consisting of: (i) a number of performance metrics, of the related performance metrics of the group, that the AI model deployment violates, (ii) a degree by which one or more performance metrics, of the related performance metrics of the group, violated by the AI model deployment exceed respective configured thresholds for the one or more violated performance metrics, and (iii) a frequency at which, or a duration of time for which, one or more performance metrics of the related performance metrics of the group violated by the AI model deployment exceed respective configured thresholds for the one or more violated performance metrics.

13. The computer system of claim 9, wherein one or more of the AI model deployments are built using a first AI model framework and one or more of the AI model deployments are built using a second AI model framework different from the first AI model framework.

14. The computer system of claim 9, wherein one or more of the AI model deployments are tuned using first tuning parameters and one or more of the AI model deployments are tuned using second tuning parameters different from the first tuning parameters.

15. The computer system of claim 9, wherein the ranking is performed by a ranking component configured to take the ranking model as an input pluggable ranker defining how to rank the AI model deployments based on the determined violation statuses.

16. A computer program product comprising:
a computer readable storage medium readable by a processing circuit and storing instructions for execution by the processing circuit for performing a method comprising:
obtaining, by an artificial intelligence (AI) analyzer component installed in a computing environment, metric values indicative of performance of AI model deployments, the metric values comprising, for each AI model deployment of the AI model deployments, respective metric values measured across a plurality of performance metrics, the performance metrics being metrics of performance of the AI model deployments;

determining violation statuses of the plurality of performance metrics for each of the AI model deployments based on thresholds configured for the plurality of performance metrics and on the respective metric values for that AI model deployment measured across the plurality of performance metrics, the violation statuses indicating, for each AI model deployment of the AI model deployments and each performance metric of the plurality of performance metrics, whether the AI model deployment violates the performance metric, as reflected by the respective metric values measured for that AI model deployment;

ranking the AI model deployments relative to each other according to a ranking model and based on the determined violation statuses of the plurality of performance metrics for each of the AI model deployments; and providing a rank of at least some of the AI model deployments for presentation to a user.

17. The computer program product of claim 16, wherein the method further comprises applying the AI model deployments to a same prediction problem, in which each of the AI model deployments provides prediction outcomes based on sets of inputs provided to each of the AI model deployments to make predictions for the prediction problem, wherein the obtained metric values are measured based on the prediction outcomes provided by the AI model deployments based on the applying.

18. The computer program produce of claim 16, wherein the plurality of performance metrics comprise a plurality of groups of related performance metrics, wherein the method further comprises determining, for each of the AI model deployments and each group of the plurality of groups, a respective group violation status indicating whether the AI model deployment violates the group as reflected by violation statuses for that AI model deployment and the performance metrics of that group, and wherein the ranking ranks the AI model deployments based at least in part on the group violation statuses for the AI model deployments.

19. The computer program product of claim 16, wherein the AI model deployments comprise at least one selected from the group consisting of:
(i) one or more AI model deployments built using a first AI model framework and one or more of the AI model deployments built using a second AI model framework different from the first AI model framework; and
(ii) one or more AI model deployments tuned using first tuning parameters and one or more of the AI model deployments tuned using second tuning parameters different from the first tuning parameters.

20. The computer program product of claim 16, wherein the ranking is performed by a ranking component configured to take the ranking model as an input pluggable ranker defining how to rank the AI model deployments based on the determined violation statuses.

* * * * *